US005245099A

United States Patent [19]

Mitariten

[11] Patent Number: 5,245,099

[45] Date of Patent: Sep. 14, 1993

[54] PSA PROCESS FOR RECOVERY OR ETHYLENE

[75] Inventor: Michael J. Mitariten, Peekskill, N.Y.

[73] Assignee: UOP, Des Plaines, Ill.

[21] Appl. No.: 918,480

[22] Filed: Jul. 22, 1992

[51] Int. Cl.[5] .......... C07C 7/12

[52] U.S. Cl. .......... 585/650; 585/826; 585/829; 95/100; 95/144

[58] Field of Search .......... 585/820, 826, 829, 650, 585/809; 55/28, 26

[56] References Cited

U.S. PATENT DOCUMENTS

| | | | |
|---|---|---|---|
| 3,176,444 | 3/1965 | Kiyonaga | 55/26 |
| 3,430,418 | 3/1969 | Wagner | 55/25 |
| 3,703,068 | 11/1972 | Wagner | 55/21 |
| 3,986,849 | 10/1976 | Fuderer et al. | 55/25 |
| 4,469,913 | 9/1984 | Dessau | 585/829 |
| 4,769,047 | 9/1988 | Dye | 585/821 |
| 4,895,584 | 1/1990 | Buck et al. | 62/29 |
| 5,012,037 | 4/1991 | Doshi et al. | 585/826 |
| 5,013,334 | 5/1991 | Maurer | 55/26 |

FOREIGN PATENT DOCUMENTS 1039163 3/1981 Japan .

OTHER PUBLICATIONS

Handbook of Petroleum Refining Processes, edited by Robert A. Meyers, published by McGraw Hill Book Company, New York, 1986, pp. 2-18 to 2-24.

Better Ethylene Separation Unit, by V. Kaiser and M. Picciotti, Hydrocarbon Processing Magazine, Nov., 1988, pp. 57-61.

*Primary Examiner*—Anthony McFarlane

*Attorney, Agent, or Firm*—Thomas K. McBride; John G. Tolomei; Richard P. Silverman

[57] ABSTRACT

A process is provided for the concentration and recovery of ethylene and heavier components from a hydrocarbon feedstream. A pressure swing adsorption (PSA) process is used to remove from hydrocarbon feedstream light cut comprising hydrogen, carbon monoxide, and methane and subsequently concentrate a heavy cut comprising the ethylene and heavy components in the PSA tail gas. In one aspect of the invention, an FCC off gas is separated into a light cut and a heavy cut and the heavy cut is routed to an ethylene plant. In another aspect of the invention, a $C_2$-rich stream is withdrawn from an ethylene plant and used to enhance the recovery of the ethylene and heavier stream in the PSA process and an ethylene-rich stream is returned to the ethylene plant.

25 Claims, 1 Drawing Sheet

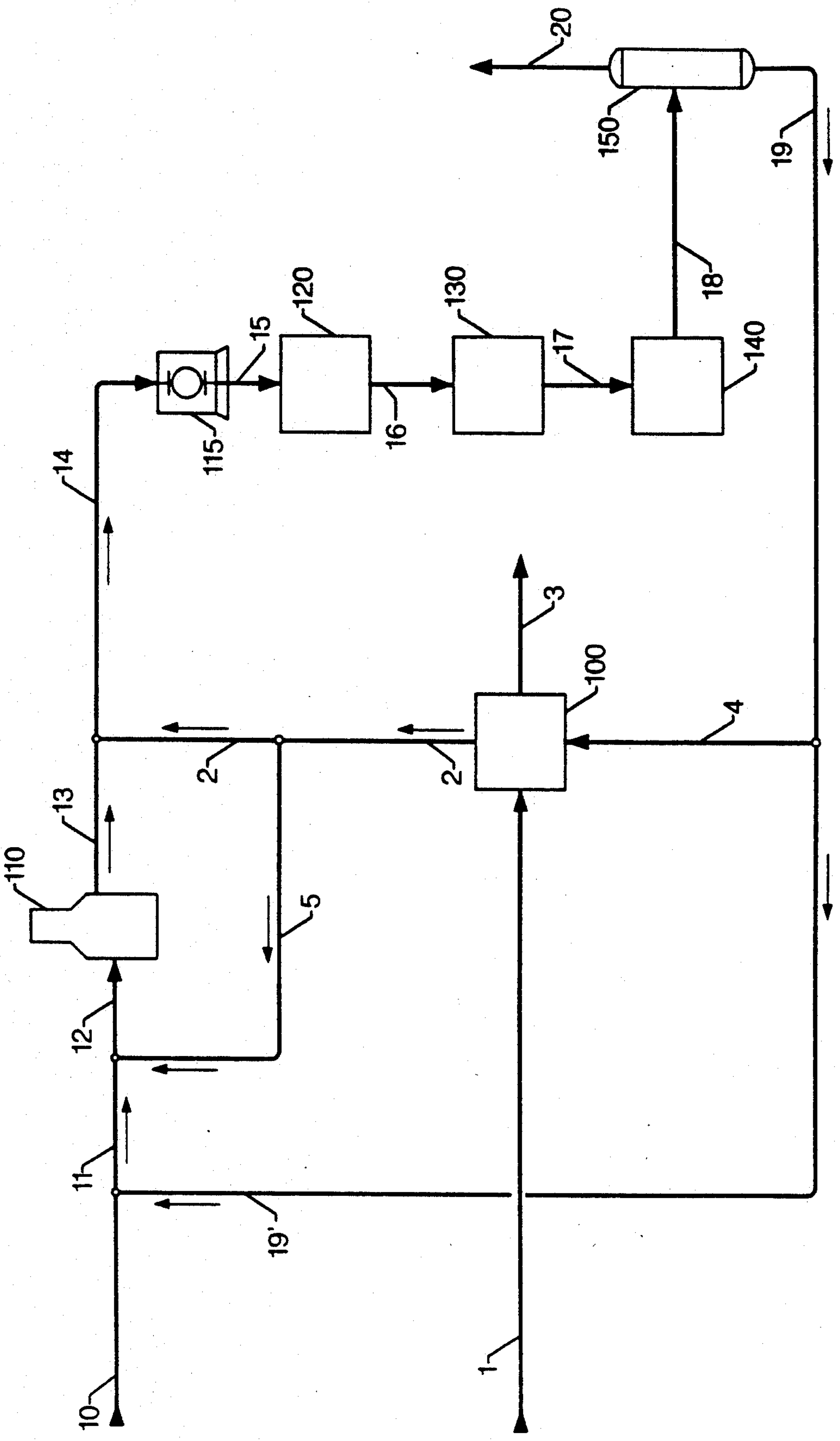
Figure

PSA PROCESS FOR RECOVERY OR ETHYLENE

FIELD OF THE INVENTION

This invention pertains to the field of separating and recovering at least one gas component from a feedstream by an adsorption process. More particularly, the present invention relates to a pressure swing adsorption process for separating a hydrocarbon feed gas comprising methane and lighter, ethylene and ethane, and heavier components into a fraction comprising predominantly methane and lighter components and a fraction comprising ethylene and heavier components.

BACKGROUND OF THE INVENTION

Hydrocarbon gas stream contains lighter components (e.g. hydrogen, nitrogen, etc.) methane, ethane and a substantial quantity of hydrocarbons of higher molecular weight, for example, propane, butane, pentane and often their unsaturated analogs. Recent changes in ethylene demand have created increased markets for ethylene and have created a need for more efficient processes which yield higher recovery levels of this product. In more recent times the use of cryogenic processes utilizing the principle of gas expansion through a mechanical device to produce power while simultaneously extracting heat from the system have been employed. The use of such equipment varies depending upon the pressure of the gas source, the composition of the gas and the desired end results. In the typical cryogenic expansion-type recovery processes used in the prior art, a gas stream under pressure is cooled by heat exchange with other streams of the process and/or external sources of cooling are employed such as refrigeration systems. As the gas is cooled, liquids are condensed, collected, and separated so as to thereby obtain desired hydrocarbons. The high pressure liquid feed is typically transferred to a demethanizer column after the pressure is adjusted to the operating pressure of the demethanizer. In such a fractionating column the liquid feed is fractionated to separate the residual methane and lighter components from the desired products of ethylene and heavier hydrocarbon components. In the ideal operation of such separation processes, the vapors, or light cut, leaving the process contain substantially all of the methane and lighter components found in the feed gas and substantially no ethylene and heavier hydrocarbon components remain. The bottom fraction, or heavy cut, leaving the demethanizer typically contains substantially all of the ethylene and heavier hydrocarbon components with very little methane or lighter components which are discharged in the fluid gas outlet from the demethanizer. A typical combined gas expansion and fractionation process for the separation of hydrocarbon gas stream comprising components ranging from nitrogen through $C_3$+hydrocarbons into a methane and lighter stream and an ethylene and heavier stream is exemplified by U.S. Pat. No. 4,895,584.

Pressure swing adsorption (PSA) provides an efficient and economical means for separating a multi-component gas stream containing at least two gases having different adsorption characteristics. The more strongly adsorbable gas can be an impurity which is removed from the less strongly adsorbable gas which is taken off as product; or, the more strongly adsorbable gas can be the desired product, which is separated from the less strongly adsorbable gas. For example, it may be desired to remove carbon monoxide and light hydrocarbons from a hydrogen-containing feed stream to produce a purified (99+%) hydrogen stream for a hydrocracking or other catalytic process where these impurities could adversely affect the catalyst or the reaction. On the other hand, it may be desired to recover more strongly adsorbable gases, such as ethane, from a feedstream to produce an ethane-rich product.

In pressure swing adsorption, a multi component gas is typically fed to at least one of a plurality of adsorption zones at an elevated pressure effective to adsorb at least one component, while at least one other component passes through. At a defined time, the feedstream to the adsorber is terminated and the adsorption zone is depressurized by one or more cocurrent depressurization steps wherein pressure is reduced to a defined level which permits the separated, less strongly adsorbed component or components remaining in the adsorption zone to be drawn off without significant concentration of the more strongly adsorbed components. Then, the adsorption zone is depressurized by a countercurrent depressurization step wherein the pressure on the adsorption zone is further reduced by withdrawing desorbed gas countercurrently to the direction of feedstream. Finally, the adsorption zone is purged and repressurized.

The combined gas stream produced during the countercurrent depressurization step and the purge step is typically referred to as the tail gas stream. The final stage of repressurization is typically performed by introducing a slipstream of product gas comprising the lightest gas component produced during the adsorption step. This final stage of repressurization is often referred to as product repressurization.

In multi-zone systems there are typically additional steps, and those noted above may be done in stages. U.S. Pat. Nos. 3,176,444 issued to Kiyonaga, 3,986,849 issued to Fuderer et al., and 3,430,418 and 3,703,068 both issued to Wagner, among others, describe multi-zone, adiabatic pressure swing adsorption systems employing both cocurrent and countercurrent depressurization, and the disclosures of these patents are incorporated by reference in their entireties.

Various classes of adsorbents are known to be suitable for use in PSA systems, the selection of which is dependent upon the feedstream components and other factors generally known to those skilled in the art. In general, suitable adsorbents include molecular sieves, silica gel, activated carbon and activated alumina. When PSA processes are used to purify hydrogen-containing streams, the hydrogen is essentially not adsorbed on the adsorbent. However, when purifying methane-containing streams, methane is often adsorbed on the adsorbent along with the impurity. The phenomenon is known in the PSA art as coadsorption.

Japanese Patent No. 1039163, issued Mar. 31, 1981 to Union Carbide Corp., discloses a process for the purification of methane by the removal of ethane from a methane-containing feedstream. The patent discloses a PSA process that employs the use of silica gel as the adsorbent. The patent discloses that the silica gel adsorbent provides (1) high differential loading for all impurities to be removed from the product methane, (2) good enrichment of impurities in the waste gas, and (3) ease of cleaning of the bed with low pressure purge gas. It is further stated that high differential loadings permit relatively small adsorption zones which are low in cost and which reduce frequency of desorption, and hence reduce the product loss associated therewith. Enrichment of impurities in the waste gas reflects the degree of separation achievable in the process and is important in order to reject the impurities with minimum loss of product component. Ease of cleaning (or desorption) permits a high purity methane product to be obtained with an economically small quantity of purge gas.

U.S. Pat. No. 5,013,334 issued to Maurer discloses a PSA process for the separation of ethane from a feedstream comprising mixtures of ethane and methane using a zeolite molecular sieve containing at least 20 equivalent percent of Zn cations and containing not more than 80 equivalent percent alkali metal cations wherein ethane and methane are adsorbed in an effluent stream enriched in methane relative to the feedstream is recovered. In a related application, U.S. Ser. No. 696,383, Maurer discloses a similar process using a calcium-Y zeolite molecular sieve adsorbent.

U.S. Pat. No. 4,769,047 issued to Dye discloses a process for the recovery of ethylene from the reactor effluent of the direct oxidation of ethylene to ethylene oxide. The ethylene is recovered from the vented light gas by first contacting the vented gas with an activated carbon adsorbent to adsorb $C_3$ and higher hydrocarbons and subsequently by pressure swing adsorption with a zeolitic molecular sieve adsorbent to separate the ethylene from carbon dioxide.

The fluid catalytic cracking (FCC) process is a petroleum refining process for the conversion of straight-run atmospheric gas/oil, vacuum gas oils, certain atmospheric residues and heavy stocks recovered from other refinery operations into high-octane gasoline, light fuel oils and olefin-rich light gases. The FCC process typically contains a reactor and catalyst regenerator, a main fractionator, and a gas concentration section. A book entitled, "*Handbook of Petroleum Refining Processes*" edited by Robert A. Meyers, published by McGraw Hill Book Company, New York, 1986, describes the typical FCC process on pages 2-18 to 2-24 and particularly describes the operation of the gas concentration section of the FCC process on pages 2-21 to 2-22. The above pages are herein incorporated by reference. In the reactor section, the FCC feedstock is cracked in a fluidized bed of catalyst to produce an FCC reactor effluent containing hydrocarbons ranging from methane through the highest boiling component in the FCC feedstock. In addition, hydrogen and hydrogen sulfide are produced. The main fractionator separates the FCC reactor effluent into an overhead stream comprising gasoline and lighter components, and liquid product. The gasoline and lighter components are separated in the gas concentration section into FCC off gas, $C_3$-$C_4$'s, and debutanized gasoline. The FCC off gas typically comprises hydrogen, carbon monoxide, nitrogen, methane, ethylene, ethane, and heavier components such as propylene, propane, butenes, butane and pentanes. Typically, the FCC off gas is used for fuel in the refinery. However, where the refinery is located in close proximity to an ethylene plant, the FCC off gas may be sent directly to the ethylene plant for the subsequent recovery of ethylene.

An ethylene plant is a very complex combination of reaction and gas recovery systems which produce ethylene by the pyrolysis or cracking of a wide range of hydrocarbon feedstocks. Typically, the hydrocarbon feedstocks, such as natural gas, naphtha or gas oil, are charged to a cracking zone in the presence of steam to produce a reactor effluent gas mixture. This reactor effluent gas mixture is subsequently separated into purified components through a complex sequence of cryogenic and fractionating steps. A typical ethylene separation section of an ethylene plant containing both cryogenic and fractionation steps to recover an ethylene product with a purity exceeding 99.5% ethylene is described in an article by V. Kaiser and M. Picciotti entitled, "Better Ethylene Separation Unit," appeared in *HYDROCARBON PROCESSING MAGAZINE*, November 1988, pages 57-61 and is herein incorporated by reference.

The existing cryogenic and fractionation system in the ethylene plant can recover the ethylene in the FCC off gas, but the penalties of this operation are significant. The high level of light components such as hydrogen, nitrogen, and methane, significantly raise the compression and refrigeration requirements in the ethylene plant for the incremental amount of ethylene recovered from the FCC off gas. Hence, it can be seen in view of the foregoing that recovering ethylene from FCC off gas is an expensive and complex process involving extensive compression and cryogenic fractionation to separate light gases such as hydrogen and methane from the ethylene. Processes are sought which enable the concentration and recovery of ethylene and heavier components from FCC off gas without expensive compression and cryogenic separation steps to remove the lighter components.

SUMMARY OF THE INVENTION

This invention provides an improved process for the concentration and recovery of ethylene and heavier components from an FCC off gas for subsequent use in an ethylene plant. By the rejection of a light cut comprising hydrogen, methane, and nitrogen from the FCC off gas in a PSA system, the concentrated ethylene and heavier portion of the FCC off gas in the PSA tail gas stream can be routed to an ethylene plant. This concentration and recovery of the ethylene and heavier components in the PSA tail gas stream results in a significant reduction in the amount of compression and refrigeration requirements in the downstream ethylene plant to obtain ethylene from the FCC off gas over schemes which route the FCC off gas directly to an ethylene plant.

In one aspect of the invention, a pressure swing adsorption process is employed to concentrate and recover a heavy cut comprising ethylene and heavier components from a hydrocarbon feedstream. The hydrocarbon feedstream comprises a light cut and a heavy cut, wherein the light cut comprises hydrogen and methane. The PSA process comprises a number of steps. The hydrocarbon feedstream is passed to an adsorption zone which contains a solid adsorbent. The solid adsorbent is selective for the adsorption of the heavy cut. The adsorption zone is maintained at an adsorption zone pressure and an adsorption zone temperature in which at least a portion of the heavy cut is adsorbed and a first adsorption zone effluent stream comprising the light cut is recovered. The light cut contained within the adsorption zone is cocurrently displaced with a second feed gas having a concentration of the heavy cut which is higher than that of the hydrocarbon feedstream. A second adsorption zone effluent stream comprising the light cut is recovered. The adsorption zone is cocurrently depressurized in a pressure equalization step to an equalization pressure to provide an equalization gas. The adsorption zone is further cocurrently depressurized to a start of blow-down pressure to provide a purge gas comprising the light cut. The adsorption zone is countercurrently depressurized to a desorption pressure, that is at or above atmospheric pressure, and a desorption effluent stream is recovered. The desorption effluent stream comprises the heavy cut. The adsorption zone is then countercurrently purged with a purge gas comprising the light cut and a purge effluent stream comprising the heavy cut is recovered. The adsorption zone is partially repressurized by introducing an equalization gas therein. The adsorption zone is further repressurized to the adsorption zone pressure.

In another embodiment, a PSA process is employed to concentrate and recover a heavy cut comprising ethylene and heavier components from an FCC off gas feedstream to provide a feed to an ethylene plant. The FCC off gas feedstream comprises a light cut and a heavy cut, wherein the light cut comprises hydrogen and methane. The PSA process comprises the following steps. The feedstream is passed to an adsorption zone at an adsorption zone pressure and an adsorption zone temperature. At least a portion of the heavy cut is adsorbed and an adsorption zone effluent stream comprising the light cut is recovered. The light cut contained within the adsorption zone is cocurrently displaced with a displacement gas comprising ethylene and heavier components. The displacement gas has a concentration of ethylene and heavier components which is higher than that of the feedstream. A displacement effluent stream comprising the light cut is recovered. The adsorption zone is cocurrently depressurized to an equalization pressure to provide an equalization gas. The adsorption zone is further cocurrently depressurized to a start of blow-down pressure to provide a provide purge gas comprising the light cut. The adsorption zone is countercurrently depressurized to a desorption pressure that is at or above atmospheric pressure and a desorption effluent stream comprising the heavy cut is recovered. The adsorption zone is countercurrently purged with a purge gas comprising the light cut and a purge effluent stream comprising the heavy cut is recovered. The desorption effluent stream and the purge effluent stream are combined and routed to an ethylene plant. The adsorption zone is partially repressurized by introducing the equalization gas therein. The adsorption zone is further repressurized to the adsorption pressure.

In a still further embodiment of the invention, a process is provided for the production of ethylene comprising the following steps. An ethylene plant feed is admixed with an ethylene enriched stream to provide a feed mixture. The feed mixture is passed to a cracking zone in an ethylene plant at a low pressure. The cracking zone is maintained at cracking zone conditions effective to produce a cracking zone effluent comprising hydrogen, carbon monoxide, carbon dioxide, water, nitrogen, ethylene, propylene, ethane, propane, and benzene. The cracking zone effluent is passed to a cracked gas compressor to raise the low pressure of the cracking zone effluent to a higher pressure to produce a high pressure cracked gas stream. A $C_2$ stream is removed from the high pressure cracked gas stream. The $C_2$ stream is passed to a $C_2$ splitter to provide an ethylene product and an ethane-rich stream, and the ethylene product is recovered. A portion of the ethane-rich stream is returned to the cracking zone. An FCC off gas stream comprising a light cut which comprises hydrogen and methane, and a heavy cut which comprises ethylene and heavier components is passed to an adsorption zone. The adsorption zone is maintained at an adsorption pressure and an adsorption temperature in which the heavy cut is adsorbed, and an adsorption effluent stream comprising the light cut is recovered. The light cut contained within the adsorption zone is cocurrently displaced with the remaining portion of the ethane-rich stream. The ethane-rich stream has a concentration of ethane. A displacement effluent stream comprising the light cut is recovered. The adsorption zone is cocurrently depressurized to an equalization pressure to provide an equalization gas. The adsorption zone is further concurrently depressurized to a start of blow-down pressure to provide a provide purge gas comprising the light cut. The adsorption zone is countercurrently depressurized to a desorption pressure that is at or above atmospheric pressure and a desorption effluent stream comprising the heavy cut is recovered. The adsorption zone is countercurrently purged with a first purge gas comprising the light cut and an ethylene-rich stream comprising the heavy cut is recovered. The ethylene-rich stream is passed to the ethylene plant. The adsorption zone is partially repressurized by the introduction of an equalization gas therein. The adsorption zone is further repressurized to the adsorption pressure.

BRIEF DESCRIPTION OF THE DRAWINGS

The invention will be better understood and its advantages will become more apparent when the following detailed description is read with reference to the accompanying drawing wherein:

The FIGURE is a schematic flow diagram of the interrelationship between the PSA process and an ethylene plant illustrating a preferred embodiment of the invention.

DETAILED DESCRIPTION OF THE INVENTION

The pressure swing adsorption process is an essentially adiabatic process for separating a multi-component fluid containing at least one selectively adsorbable component. The PSA process of the invention relates to conventional PSA processing in which each bed of an adsorption zone undergoes, on a cyclic basis, high pressure adsorption, optional cocurrent depressurization to intermediate pressure level(s) with release of void space gas from the product end of the bed, countercurrent depressurization to lower desorption pressure with the release of desorbed gas from the feed end of the bed, with or without purge of the bed, and repressurization to higher adsorption pressure. The process of the present invention adds to this basic cycle sequence the use of a cocurrent displacement step in the adsorption zone in which the less readily adsorbable component is further and preferably essentially completely removed therefrom. The adsorption zone is then countercurrently depressurized to a desorption pressure that is at or above atmospheric pressure with the more adsorbable component(s) being discharged from the feed end thereof as a product of desired purity. In the multibed adsorption systems to which the invention is directed, the displacement gas used for each bed is obtained by diverting a portion of the gas released from that or another bed in the system during the countercurrent depressurization steps, following recompression or preferably obtained from an external stream which comprises the more readily adsorbable component in the feed gas.

Those skilled in the art will appreciate that the high pressure adsorption step of the PSA process comprises introducing the feedstream to the feed end of the adsorbent bed at a high adsorption pressure. The less readily adsorbable component(s) passes through the bed and is discharged from the produce end thereof. An adsorption front or fronts are established in the bed with said fronts likewise moving through the bed from the feed end toward the product end thereof. When the feedstream contains a less readily adsorbable component and a more readily adsorbable component, a leading adsorption front of the more readily adsorbable component will be established and move through the bed in the direction of the product or discharge end thereof.

The hydrocarbon feedstream of this invention comprises from about 10 to about 60 mol % hydrogen, from about 5 to 50 mol % methane, and from about 10 to 60 mol % ethylene and heavier components.

In the adsorption zone, the more readily adsorbable components are adsorbed at an adsorption pressure temperature and the less readily adsorbable components are passed through the adsorption zone. The adsorption zone pressure ranges from about 3.5 to about 35.9 $kg/cm^2$ absolute (about 50 to about 500 psia). The adsorption zone temperature is any temperature effective to adsorb the more readily adsorbable components in the feedstream, and preferably from about $-18°$ to about 205° C. (about 0° to about 400° F.). It is to be understood that the adsorption zones of the present invention contain adsorber beds containing adsorbent suitable for adsorbing the particular components to be adsorbed therein. As the capacity of the adsorber bed for the more readily adsorbable component is reached, that is, preferably before a substantial portion of the leading adsorption front has passed through the first adsorber bed, the feedstream is directed to another bed in the adsorption zone. It is to be also understood that the term "countercurrent" denotes that the direction of gas flow through the adsorption zone, i.e., adsorber bed, is countercurrent with respect to the direction of feedstream flow. Similarly, the term "cocurrent" denotes flow in the same direction as the feedstream flow. The purge gas is at least partially comprised of an effluent stream, e.g., the adsorption effluent stream or the cocurrent displacement effluent stream, from the adsorption zone, as hereinafter described, which comprises the less readily adsorbable component. When hydrogen is the less readily adsorbable component, the purge gas is preferably rich in hydrogen at a higher concentration than available in the feedstream. The term "enriched" is intended to be with reference to the feedstream composition unless otherwise noted. A displacement gas is passed through the bed in a direction cocurrent to the feeding step. By the use of a cocurrent displacement gas substantially reduced and preferably essentially free of the less readily adsorbable component, thus having a molar concentration of more readily adsorbable components, the less readily adsorbable component that remains in the void spaces of the adsorbent bed ahead of the leading adsorption front can be essentially completely displaced from the bed. This enables the more readily adsorbable component to be thereafter discharged from the feed end of the bed as a product of desired purity by countercurrently depressurizing the bed. The cocurrent displacement step can be performed in conjunction with one or more cocurrent depressurization steps. When a cocurrent depressurization step is used, it can be performed either before, simultaneously with, or subsequent to the displacement step. The effluent stream from the cocurrent depressurization step, which is comprised primarily of less readily adsorbable components, can be used to partially repressurize or purge another adsorber bed. The combination of the desorption effluent resulting from the cocurrent depressurization step and the purge step are combined to have ethylene and heavier product purity of from about 20 to about 95 mol %.

After the termination of the cocurrent displacement step and any desired cocurrent depressurization step(s), the adsorber bed is desorbed by reducing the pressure in a direction countercurrent to the feeding direction to a desorption pressure that is preferably from about atmospheric pressure to about 3.5 $kg/cm^2$ absolute (about 50 psia). A portion of the desorption effluent stream recovered from the adsorption zone could be utilized as feed for the countercurrent displacement step following recompression. Preferably, an external stream is used as the feed for the cocurrent displacement step.

A PSA cycle for a five bed adsorption zone employing cocurrent displacement is shown in Table 1 below.

TABLE 1

| Bed No. | Cycle | | | | | | | | | |
|---|---|---|---|---|---|---|---|---|---|---|
| 1 | A | | C | | E | PP | BD | P | E | R |
| 2 | E | R | A | | C | | E | PP | BD | P |
| 3 | BD | P | E | R | A | | C | | E | PP |
| 4 | E | PP | BD | P | E | R | A | | C | |
| 5 | C | | E | PP | BD | P | E | R | A | |

In the above table, A represents an adsorption step at adsorption pressure and temperature, with the feedstream being introduced to the feed end of a bed in the adsorption zone and the less readily adsorbable components being discharged from the product end thereof.

C represented cocurrent displacement by the introduction of gas essentially free of the less readily adsorbable component to the feed end of the bed so as to further, and preferably essentially completely displace said less readily adsorbable component from the bed; E represents a cocurrent depressurization step or a pressure equalization step between a bed that has completed its cocurrent displacement step and a bed that has been purged at lower desorption pressure; PP represents a cocurrent depressurization step with discharge of less readily adsorbable component from the product end thereof thereafter used for product, purge gas, or repressurization gas; BD represents a countercurrent depressurization step wherein the desorption product comprises the more readily adsorbable component at the desired purity; P represents a purging step at low pressure in the adsorption zone; R represents a repressurization step wherein a process gas is utilized to repressurize the adsorber bed to the adsorption pressure; E represents an equalization step wherein the bed is countercurrently pressurized with a gas from another bed undergoing cocurrent depressurization. It will be understood that in addition to the five-bed configuration illustrated above for the adsorption zone, other configurations, i.e., 3, 4, 6 or more beds, can be employed and are intended to be within the scope of the present invention.

It will further be understood that various changes and modifications can be made in the details of the PSA process with intermediate product recovery as herein described and illustrated above without departing from the scope of the invention as set forth in the appended claims. Thus, in addition to varying the number of beds employed, the number of cocurrent depressurization-pressure equalization steps employed, whether or not such pressure equalizations are direct or indirect through an external storage vessel, whether the displacement gas employed is available from an external source or, for example, is supplied by diverting a portion of the countercurrent depressurization gas, may all be varied depending upon the circumstances and results desired in any given application. In the equalization step, the adsorption zone is partially repressurized by introducing an equalization gas until the pressure of the adsorption zone is approximately equal to the equalization pressure. In the process of this invention, the cocurrently depressurizing step can comprise two or more pressure equalization steps. The copurge is preferably taken as represented hereinabove, but may also occur following the cocurrently depressurizing step and prior to the further cocurrently depressurizing step. Accordingly, the individual steps described, as well as conventional variations thereof are generally known by those skilled in the art and need not be further described herein. It will be further understood that PSA systems necessarily incorporate various conduits, valves, and other control features to accomplish the necessary switching of adsorbent beds from one step to the next, in appropriate sequence as in conventional PSA operations.

It will also be understood that the invention can be carried out using any suitable adsorbent material in the adsorption zone having a selectivity for various components of a feedstream over other such components, thereby providing a less readily adsorbable component and a more readily adsorbable component. Suitable adsorbents known in the art and commercially available include crystalline molecular sieves, activated carbons, activated clays, silica gels, activated aluminas and the like. The molecular sieves include, for example, the various forms of silicoaluminophosphates, and aluminophosphates disclosed in U.S. Pat. Nos. 4,440,871; 4,310,440 and 4,567,027, hereby incorporated by reference as well as zeolitic molecular sieves. Preferably, the solid adsorbent selective for the adsorption of the ethylene and heavier components, or heavy cut is selected from the group consisting of silica gel, activated carbon, activated alumina, zeolite molecular sieves, and mixtures thereof.

Zeolitic molecular sieves in the calcined form may be represented by the general formula;

$$Me_{\frac{2}{n}}O : Al_2O_3 : xSiO_2 : yH_2O$$

where Me is a cation, x has a value from about 2 to infinity, n is the cation valence and y has a value of from about 2 to 10.

Typical well-known zeolites which may be used include, chabazite, also referred to as Zeolite D, clinoptilolite, erionite, faujasite, also referred to as Zeolite X and Zeolite Y, ferrierite, mordenite, Zeolite A, and Zeolite P. Other zeolites suitable for use according to the present invention are those having a high silica content, i.e., those having silica to alumina ratios greater than 10 and typically greater than 100. One such high silica zeolite is silicalite, as the term used herein includes both the silicapolymorph disclosed in U.S. Pat. No. 4,061,724 and also the F-silicalite disclosed in U.S. Pat. No. 4,073,865, hereby incorporated by reference. Detailed descriptions of some of the above identified zeolites may be found in D. W. Breck, *ZEOLITE MOLECULAR SIEVES*, John Wiley and Sons, New York, 1974, hereby incorporated by reference.

It is often desirable when using crystalline molecular sieves that the molecular sieve be agglomerated with a binder in order to ensure that the adsorbent will have suitable physical properties. Although there are a variety of synthetic and naturally occurring binder materials available such as metal oxides, clays, silicas, aluminas, silica-aluminas, silica-zirconias, silica-thorias, silica-berylias, silica-titanias, silica-alumina-thorias, silica-alumina-zirconias, mixtures of these and the like, clay-type binders are preferred. Examples of clays which may be employed to agglomerate the molecular sieve without substantially altering the adsorptive properties of the zeolite are attapulgite, kaolin, volclay, sepiolite, polygorskite, kaolinite, bentonite, montmorillonite, illite and chlorite. The choice of a suitable binder and methods employed to agglomerate the molecular sieves are generally known to those skilled in the art and need not be further described herein.

The production of ethylene is described in the Encyclopedia of Chemical Processing and Design, edited by John J. McKetta, published by Marcel Dekker, Inc., New York, 1984, Vol. 2, pages 88–93. Typical single pass pyrolysis yields for individual light paraffin feedstocks to the ethylene plant are shown on page 126, in Table 8 of the above reference. The yields obtained from mixtures thereof are nearly additive of the yields for each individual feedstock. The ultimate yields in recycle operations are obtained from single pass yields by dividing the yield by the conversion of each individual feedstock. Unconverted light, components such as ethane and propane are usually recycled. Ethane results in the highest yield of ethylene per pass, but at the lowest conversion per pass. Conversion per pass for ethane ranges from 50 to 60%, and results in a corresponding yield of 41.6 to 48.2% mole ethylene produced per mole of ethane. Pages 88–93 and pages 126–133 of the above reference are herein incorporated by reference. Thus, it is an advantage to recover and recycle to the cracking section as much ethane as possible. In a low pressure reactor system for the production of ethylene, the effluent for the cracking zone comprises light components, such as hydrogen, carbon monoxide, methane, and nitrogen; desired products, such as ethylene and propylene; and the saturates and secondary products, such as ethane, propane, and benzene. The effluent from the low pressure cracking zone is passed to a cracked gas compressor which raises the pressure of the effluent from about atmospheric pressure to a pressure of about 21 to about 42 kg/cm$^2$ absolute (about 300 to about 600 psia) whereupon the compressed gas is passed to an acid gas removal zone for the removal of gases such as hydrogen sulfide and carbon dioxide. The acid free gas is passed to a drying zone containing a solid bed desiccant for the removal of water prior to being passed to a separation zone. The separation zone comprises a combination of cryogenic separations for the removal of hydrogen, and refrigeration and fractionation for the further separation of the primary products. A $C_2$ stream comprising ethane and ethylene is passed from the separation zone to a $C_2$ splitter column. The $C_2$ splitter column which operates at a pressure from about 21 to about 32 $kg/cm^2$ absolute (from about 300 to about 450 psia) produces the ethylene product at a purity greater than about 99.5%. The ethane stream which is withdrawn from the $C_2$ splitter is typically recycled to the cracking zone representing a significant recycle to the cracking zone.

When the actual pyrolysis or cracking reactions are carried out at a low pressure, near atmospheric pressure, the cracking effluent must be compressed to a higher pressure ranging from about 21 to about 42 $kg/cm^2$ absolute (about 300 to about 600 psia) before the separation of the cracking effluent into purified products can be performed. It is this combination of the low pressure cracking combined with the high pressure separation which creates the opportunity to employ a PSA system to concentrate and recover ethylene and heavier components from FCC off gas for use of the ethylene and heavier components in the ethylene plant. The PSA process operates most efficiently when the adsorption pressure, the pressure at which the adsorption step takes place, is more preferably in the range of about 18 to about 35.9 $kg/cm^2$ (about 250 to about 500 psia). The desorption pressure, the pressure at which the desorption effluent is recovered, is in the range of about atmospheric pressure to about 7 $kg/cm^2$ absolute (about 100 psia), preferably from about atmospheric pressure to about 3.5 $kg/cm^2$ absolute (about 50 psia). The PSA efficiency increases as the desorption pressure approaches atmospheric pressure. In the process of the instant invention, FCC light gas can be concentrated into a light cut and a heavy cut. The light cut comprising hydrogen and methane is removed during the adsorption step, while the ethylene and heavier components are adsorbed on the solid adsorbent and subsequently recovered during the desorption step of a typical PSA cycle. The recovery of ethylene and heavier components can be further enhanced by the addition of a copurge step wherein a portion of the ethane recovered from the ethylene plant $C_2$ splitter can be used as a second feed in the PSA cycle at a point in the cycle preferably following the adsorption step. The copurge step, or the cocurrently displacing step, may also occur following the cocurrently depressurizing step and prior to the further cocurrently depressurizing step. In the copurge step, the second feed is cocurrently passed to the adsorption zone forcing additional unadsorbed material from the adsorption zone. The second feed must have a concentration of the more readily adsorbable components which is greater than the concentration of the more readily adsorbable component in the first feed. Typically, this additional unadsorbed material withdrawn in the copurge step is combined with the effluent from the adsorption step. During the copurge step, as the unadsorbed material is forced from the adsorption zone, filling the adsorption zone with the more adsorbable second feed, and sharpening the mass transfer front within the adsorption zone. This sharpening of the mass transfer front improves the purity of the more readily adsorbable component when it is subsequently withdrawn in the desorption step.

Following the copurge, or cocurrently displacing step, the adsorption zone is cocurrently depressurized. This cocurrently depressurizing step is known in the art as a pressure equalization step which reduces the pressure of the adsorption zone to an equalization pressure of from about 5 to about 18 $kg/cm^2$ absolute (about 75 to about 250 psia). Although only one pressure equalization step is exemplified herein, two or more pressure equalization steps to intermediate pressure level(s) may be employed to approach the equalization pressure at the conclusion of the final equalization step. A further cocurrently depressurizing step is used to provide a purge gas for another adsorption zone and reduce the process to a start of blow-down pressure, ranging from about 1.8 to about 7 $kg/cm^2$ absolute (about 25 to about 100 psia).

The process of this invention is illustrated in the FIGURE. An ethylene plant feed in line 10, such as naphtha, ethane, natural gas or gas oil is admixed with an ethane-rich stream 19' and the feed mixture in lines 11 and 12 is passed to a cracking zone 110. The cracking zone is operating at cracking zone conditions consisting of a low pressure ranging from about atmospheric pressure to about 1 $kg/cm^2$ absolute (50 psia), and a temperature of from about 700° to about 1000° C. and effective to produce a cracking zone effluent in line 13 comprising hydrogen, carbon monoxide, carbon dioxide, water, nitrogen, ethylene, propylene, ethane, propane, butenes, butane, pentane, pentenes and benzene. Sulfur compounds such as hydrogen sulfide may also be produced to the extent sulfur is present in the ethylene plant feed. The cracking zone effluent is passed from line 13 through line 14 to the cracked gas compressor 115 which raises the pressure of the cracking zone effluent from the low pressure of the cracking zone to a high pressure ranging from about 21 to about 42 $kg/cm^2$ absolute (about 300 to about 600 psia). The high pressure cracking zone effluent 15 is passed to an acid gas removal zone 120 wherein acid gases such as carbon dioxide and hydrogen sulfide are removed by adsorption. The acid gas removal step removes potential catalyst poisons from the product and prevents carbon dioxide from entering the separation zone wherein carbon dioxide or hydrogen sulfide might freeze. The acid reduced gas is passed in line 16 to a drying zone 130 wherein the acid reduced gas is contacted with a solid adsorbent or desiccant to remove any remaining water. The essentially water-free effluent is passed via line 17 to a separation zone 140. In the separation zone 140 a series of refrigeration and fractionation steps take place to separate the key olefinic product streams in a sequence of distillation column. The hydrogen is typically separated from fuel gas comprising methane in a Joule Thompson cold box operating at cryogenic conditions. A $C_2$ stream comprising ethane and ethylene and some inerts such as nitrogen is passed via line 18 to a $C_2$ splitter 150. The $C_2$ splitter is operated as a superfractionator providing an ethylene product 20 with a purity equal to or greater than 95 mol % ethylene, and an ethane-rich stream 19 having a concentration ranging from about 85 to 100 mol % ethane, preferably equal to or greater than 90 mol % ethane. Any inert material is typically vented in an upper section of the $C_2$ splitter to maintain the high purity requirements of the ethylene product.

According to the process of this invention, a portion of the ethane-rich stream is withdrawn from the ethylene plant in line 4 and used as a second or copurge feed to an adsorption zone 100 in a pressure swing adsorption process. Although not shown in the drawing, other streams from the ethylene plant comprising ethylene and heavier components may be used to copurge the adsorption zone. Depending upon the specific conditions, a portion of the $C_2$ stream 18 withdrawn from the separation zone; a portion of the ethylene plant feed 10 when said feed is ethane; and, a portion of the ethylene product may be used as a copurge, or second feed to the adsorption zone. A portion of the ethane-rich stream is passed via line 19' into admixture with the ethylene plant feed 10 and passed via lines 11 and 12 to the cracking zone. The conversion of ethane per pass in the cracking zone is about 50 to about 60%, depending upon the cracking conditions and the residence time in the cracking zone. Thus, the recycle of the ethane-rich stream in the ethylene plant represents a significant amount of ethane which must be recycled to the cracking zone and subsequently separated in the separation zone.

Additional ethylene is recovered from an FCC off gas stream in line 1 by passing the FCC off gas stream, comprising hydrogen, methane, nitrogen, carbon monoxide, ethylene, ethane and heavier components, to an adsorption zone 100. A light cut comprising hydrogen, methane, nitrogen, and carbon monoxide is withdrawn via line 3. The light cut may be used for fuel or passed to a process for recovery of hydrogen. A heavy cut, comprising ethylene and heavier components is recovered and returned to the ethylene plant via line 2. In a preferred embodiment, the heavy cut is admixed with the cracking zone effluent 13 and returned to the cracked gas compressor 115 in line 14. As an alternative, the heavy cut which includes a portion of the ethane-rich stream 4 employed as a second feed, or copurge feedstream, is returned to the cracking zone 110 by admixing the heavy cut in line 5 with the ethylene plant feed in line 11 and passing the mixture via line 12 to the cracking zone 110.

The following example is provided to illustrate the present invention and is not intended to limit the scope of the claims that follow.

EXAMPLE 1

An FCC off gas from a refinery is available from the gas concentration section at a flowrate of 15,000 $Nm^3/hr$, a temperature of 40° C. and a pressure of 11 $kg/cm^2$ absolute. The FCC off gas comprises 24.9 mol % hydrogen and 7.5 mol % nitrogen, 23.2 mol % methane and 43.7 mol % ethylene and heavier components. The full composition is shown in Table 1 in the column entitled "Feed". The FCC off gas is passed to an adsorption zone containing a sufficient quantity of silica gel adsorbent to adsorb the ethylene and heavier components in the FCC off gas. The operation of the PSA system was calculated according to standard engineering practices and the results are shown in the columns entitled "Light Cut" and "Heavy Cut." As shown, the recovery of the ethylene and heavier components was about 97.4 mol % and the recovery of the propylene was about 100 mol %. The rejection of the light components ($H_2$, $O_2$, $N_2$, CO, $CO_2$, and methane) into the light cut was 80.5% mol. The light cut was produced at a flowrate of 6970 $Nm_3/hr$, a temperature of 45° C. and a pressure of 10 $kg/cm^2$ absolute. The heavy cut was produced at a temperature of 35° C., and a pressure of 1.1 $kg/cm^2$.

TABLE 1

| | Feed | Light Cut | Heavy Cut |
|---|---|---|---|
| Flow rate, $Nm^3/hr$ | 15,000 | 6,970 | 8,030 |
| Composition, mol % | | | |
| $H_2$ | 24.9 | 49.84 | 3.25 |
| $O_2$ | 0.1 | 0.19 | .02 |
| $N_2$ | 7.5 | 13.56 | 2.24 |
| CO | 0.3 | 0.49 | .14 |
| $CO_2$ | 0.3 | — | .56 |

TABLE 1-continued

| | Feed | Light Cut | Heavy Cut |
|---|---|---|---|
| Methane | 23.2 | 33.46 | 14.30 |
| Ethane | 11.3 | 1.22 | 20.05 |
| Ethylene | 11.6 | 1.24 | 20.59 |
| $C_3H_8$ | 2.8 | — | 5.23 |
| $C_3H_6$ | 12.0 | — | 22.41 |
| $C_4^+$ | 6.0 | — | 11.21 |

EXAMPLE 2

In Example 2, the FCC off gas of Example 1 was processed in the PSA section of Example 1 with the addition of a copurge step wherein a portion of the ethane recovered from the $C_2$ splitter in the ethylene plant was used to copurge the adsorption zone of the PSA section at a point in the PSA cycle following the adsorption step and before the cocurrent depressurization step. As in Example 1, the effect of the addition of the copurge step was determined by engineering calculation techniques. The ethane stream was introduced at a rate of 2250 $Nm^3/hr$ at a temperature of about 40° C. and an absolute pressure of about 11 $kg/cm^2$ absolute. The resulting light cut was 7605 $Nm^3/hr$ at a temperature of 45° C. and an absolute pressure of about 10 $kg/cm^2$. The resulting light cut hydrogen concentration was 47 mol % and the methane concentration was about 37 mol %. The flowrate of heavy cut was 9645 $Nm^3/hr$, at a temperature of 35° C. and an absolute pressure of about 1.1 $kg/cm^3$. The overall recovery of ethylene and heavier components was 98 mol % and the recovery of propylene was 100%. The results of the operation of Example 2 are shown in Table 2. In Example 2, rejection of the light components into the light cut was 88% mol, an increase of 8% over the PSA cycle without the copurge step. In Example 1, 46.4% of the FCC off gas was removed as the light cut and the remaining 53.6% comprising concentrated ethylene and heavier components were routed to the ethylene plant. In Example 2, 50.7% of the FCC off gas was removed as the light cut and the remaining 49.3% comprising ethylene and heavier components were returned to the ethylene plant along with the ethane copurge gas. In either Example 1 or Example 2, the recovered ethylene and heavier components may be returned to the cracking zone and admixed with the feed to the ethylene plant, or the recovered ethylene and heavier components may be returned to the suction side of the cracked gas compressor in a low pressure ethylene plant. The rejected amounts of light components to the light cut in Examples 1 and 2 are shown in Table 3. The choice of whether to return the recovered ethylene and heavier stream to the cracking zone, or the compressor will be determined based upon the actual ethylene content of this stream relative to the amount of ethane contained therein. The rejection of the light cut from the FCC off gas with PSA or a PSA process with a copurge step is directly responsible for a reduced refrigeration and compression cost with the ethylene plant compared to the direct introduction of the FCC off gas to either the cracking zone or the cracked gas compressor without the PSA steps.

TABLE 2

| | PSA With Ethane Copurge | | | |
|---|---|---|---|---|
| | Feed | Ethane | Light Cut | Heavy Cut |
| Flow rate, $Nm^3/hr$ | 15,000 | 2,250 | 7,605 | 9,645 |
| Composition mol % | | | | |
| $H_2$ | 24.9 | — | 47.14 | 1.56 |

TABLE 2-continued

| PSA With Ethane Copurge | | | | |
|---|---|---|---|---|
| | Feed | Ethane | Light Cut | Heavy Cut |
| $O_2$ | 0.1 | — | 0.18 | 0.01 |
| $N_2$ | 7.5 | — | 13.31 | 1.17 |
| CO | 0.3 | — | 0.50 | 0.07. |
| $CO_2$ | 0.3 | — | — | 0.47 |
| Methane | 23.2 | — | 36.61 | 7.22 |
| Ethane | 11.3 | 100 | 1.12 | 40.02 |
| Ethylene | 11.6 | — | 1.14 | 17.14 |
| $C_3H_8$ | 2.8 | — | — | 4.35 |
| $C_3H_6$ | 12.0 | — | — | 18.66 |
| $C_4{}^+$ | 6.0 | — | — | 9.33 |

TABLE 3

| Light Component Rejection | | |
|---|---|---|
| | Example 1 | Example 2 |
| Product | Light Cut | Light Cut |
| Flow Rate $Nm^3/hr$ | 6798 | 7433 |
| Rejection, mol % | 80.5 | 88.0 |

I claim:

1. A pressure swing adsorption process for the concentration and recovery of a heavy cut comprising ethylene and heavier components from a hydrocarbon feedstream comprising a light cut and said heavy cut, said light cut comprising hydrogen and methane, said process comprising the following steps:

(a) passing said hydrocarbon feedstream to an adsorption zone containing a solid adsorbent selective for the adsorption of said heavy cut, said adsorption zone having an adsorption zone pressure and an adsorption zone temperature in which at least a portion of the heavy cut is adsorbed and recovering a first adsorption zone effluent stream comprising said light cut;

(b) cocurrently displacing said light cut contained within said adsorption zone with a displacement gas having a concentration of said heavy cut which is higher than that of said hydrocarbon feedstream and recovering a second adsorption zone effluent stream comprising said light cut;

(c) cocurrently depressurizing said adsorption zone to an equalization pressure to provide an equalization gas to another adsorption zone undergoing repressurization;

(d) further cocurrently depressurizing said adsorption zone to a start of blow-down pressure to provide a purge gas comprising said light cut;

(e) countercurrently depressurizing said adsorption zone to a desorption pressure that is at or above atmospheric pressure and recovering a desorption effluent stream comprising said heavy cut;

(f) countercurrently purging said adsorption zone with a purge gas comprising said light cut and recovering a purge effluent stream comprising said heavy cut.

(g) partially repressurizing said adsorption zone by introducing an equalization gas therein; and (h) further repressurizing the adsorption zone to the adsorption pressure.

2. The process of claim 1 wherein the hydrocarbon feedstream is a fluid catalytic cracking (FCC) off gas.

3. The process of claim 1 wherein the solid adsorbent selective for the adsorption of said heavy cut is selected from the group consisting of silica gel, activated carbon, activated alumina, zeolite molecular sieves, and mixtures thereof.

4. The process according to claim 1 where in step (b) takes place before, simultaneously with, or subsequent to step (c).

5. The process of claim 1 wherein the cocurrently depressurizing step comprises two or more pressure equalization steps.

6. The process of claim 1 wherein the displacement gas is an ethane-rich stream.

7. The process of claim 6 wherein the ethane-rich stream is derived from a $C_2$ splitter located in an ethylene plant and the desorption effluent is returned to said ethylene plant.

8. The process of claim 6 wherein the ethane-rich stream is a portion of an ethylene plant feed comprising ethane.

9. The process of claim 1 wherein the adsorption pressure ranges from about 3.5 to about 35.9 $kg/cm^2$ absolute (about 50 to about 500 psia) and the adsorption temperature ranges from about −18 to about 205° C. (about 0° to about 400° F.).

10. The process of claim 9 wherein the adsorption zone equalization pressure is from about 5 to about 18 $kg/cm^2$ absolute (about 75 to about 250 psia).

11. The process of claim 9 wherein the start of blow-down pressure is from about 1.8 to about 7 $kg/cm^2$ absolute (about 25 to about 100 psia).

12. The process of claim 11 wherein the desorption pressure is from about atmospheric pressure to about 3.5 $kg/cm^2$ absolute (about 50 psia).

13. The process of claim 1 wherein the hydrocarbon feedstream comprises from about 10 to 60 mol % hydrogen, from about 5 to 50 mol % methane and from about 10 to 60 mol % ethylene and heavier components.

14. The process of claim 1 wherein the first adsorption zone effluent stream and the second adsorption zone effluent stream combined have a product purity of between about 40 and about 99 mol % hydrogen.

15. The process of claim 1 wherein the desorption effluent stream and the purge effluent stream combined have a product purity of about 20 to about 95 mol % ethylene and heavier components.

16. A pressure swing adsorption process for the concentration and recovery of a heavy cut comprising ethylene and heavier components from a fluid catalytic cracking (FCC) off gas feedstream to provide a feed to an ethylene plant, said FCC off gas feedstream comprising a light cut and said heavy cut, said light cut comprising hydrogen and methane said process comprising the following steps:

(a) passing said feedstream to an adsorption zone at an adsorption zone pressure and an adsorption zone temperature in which at least a portion of the heavy cut is adsorbed and recovering an adsorption zone effluent stream comprising said light cut;

(b) cocurrently displacing said light cut contained within said adsorption zone with a displacement gas comprising ethylene and heavier components, said displacement gas having a concentration of ethylene and heavier components which is higher than that of the feedstream and recovering a displacement effluent stream comprising said light cut;

(c) cocurrently depressurizing said adsorption zone to an equalization pressure to provide an equalization gas;

(d) further cocurrently depressurizing said adsorption zone to a start of blow-down pressure to provide a provide-purge gas comprising said light cut;

(e) countercurrently depressurizing said adsorption zone to a desorption pressure that is at or above atmospheric pressure and recovering a desorption effluent stream comprising said heavy cut;

(f) countercurrently purging said adsorption zone with a purge gas comprising said light cut and recovering a purge effluent stream comprising said heavy cut;

(g) combining said desorption effluent stream and said purge effluent stream and passing said combination to an ethylene plant;

(h) partially repressurizing said adsorption zone by introducing an equalization gas therein; and (i) further repressurizing the adsorption zone to the adsorption pressure.

17. The process of claim 6 wherein the displacement gas comprises ethylene.

18. The process of claim 6 wherein the displacement gas comprises ethane.

19. The process of claim 8 wherein the concentration of ethane in said displacement gas ranges from about 50 to about 100 mol % ethane.

20. A process for the production of ethylene comprising:

(a) admixing an ethylene plant feed with an ethylene enriched stream to provide a feed mixture and passing said feed mixture to a cracking zone in an ethylene plant at a low pressure, said cracking zone maintained at cracking zone plant conditions effective to produce a cracking zone effluent comprising hydrogen, carbon monoxide, carbon dioxide, water, nitrogen, ethylene, propylene, ethane, propane and benzene;

(b) passing said cracking zone effluent to a cracked gas compressor to raise the low pressure of the cracking zone effluent to a higher pressure to provide a high pressure cracked gas stream;

(c) removing a $C_2$ stream from the high pressure cracked gas stream and passing said $C_2$ stream to a $C_2$ splitter to provide an ethylene product and an ethane-rich stream, and recovering the ethylene product and returning a portion of said ethane-rich stream to the cracking zone;

(d) passing a fluid catalytic cracking (FCC) off gas stream comprising a light cut comprising hydrogen and methane and a heavy cut comprising ethylene and heavier components to an adsorption zone said adsorption zone maintained at an adsorption pressure and an adsorption temperature in which the heavy cut is adsorbed, and recovering an adsorption effluent stream comprising said light cut;

(e) cocurrently displacing the light cut contained within said adsorption zone with a portion of said ethane-rich stream having a concentration of ethane and recovering a displacement effluent stream comprising said light cut;

(f) cocurrently depressurizing the adsorption zone to an equalization pressure to provide an equalization gas;

(g) further cocurrently depressurizing the adsorption zone to a start of blow-down pressure to provide a purge gas comprising said light cut;

(h) countercurrently depressurizing the adsorption zone to a desorption pressure that is at or above atmospheric pressure and recovering a desorption effluent stream comprising said heavy cut;

(i) countercurrently purging the adsorption zone with a first purge gas comprising said light cut and recovering an ethylene-rich stream comprising said heavy cut and passing said ethylene-rich stream to said ethylene plant;

(j) partially repressurizing the adsorption zone by introducing the equalization gas therein; and (k) further repressurizing the adsorption zone to the adsorption pressure.

21. The process of claim 20 wherein the low pressure of the cracking zone ranges from about atmospheric pressure to about 3.5 $kg/cm^2$ absolute (about 50 psia).

22. The process of claim 20 wherein the higher pressure of the high pressure cracked gas stream ranges from about 21 to about 42 $kg/cm^2$ absolute (about 300 to about 600 psia).

23. The process of claim 20 wherein the concentration of ethane in the ethane-rich stream ranges from 85 to 100 mol % ethane.

24. The process of claim 20 further comprising returning the ethylene-rich stream to the cracked gas compressor in the ethylene plant.

25. The process of claim 20 further comprising returning the ethylene-rich stream to the cracking zone in the ethylene plant.

* * * * *